United States Patent [19]

Marquess

[11] 4,249,420
[45] Feb. 10, 1981

[54] BEARING PRELOAD ASSEMBLY FOR USE IN AN OIL FILLED ACCELEROMETER

[75] Inventor: Richard D. Marquess, Concord, Calif.

[73] Assignee: Systron-Donner Corporation, Concord, Calif.

[21] Appl. No.: 65,376

[22] Filed: Aug. 9, 1979

[51] Int. Cl.³ .............................................. G01P 15/02
[52] U.S. Cl. ................................. 73/516 R; 308/2 R
[58] Field of Search .................... 73/514, 515, 516 R, 73/517 R, 517 B; 74/17.8, 18, 18.1; 308/2, 26

[56] References Cited

U.S. PATENT DOCUMENTS

| | | | |
|---|---|---|---|
| 3,151,488 | 10/1964 | Tracy et al. | 73/517 B |
| 3,176,521 | 4/1965 | Clark | 73/517 B |
| 3,264,884 | 8/1966 | Brooker | 74/17.8 X |
| 3,897,690 | 8/1975 | Hanson | 73/517 B |
| 4,131,020 | 12/1978 | Hugli et al. | 73/517 B |

*Primary Examiner*—James J. Gill
*Attorney, Agent, or Firm*—Flehr, Hohbach, Test, Albritton & Herbert

[57] ABSTRACT

A pendulous type of accelerometer is disclosed herein and includes a sealed housing defining an oil filled internal chamber, a pendulous member located within the housing chamber and a pair of bearing mechanisms for pivotally supporting the pendulous member. The accelerometer also includes an assembly associated with each of the bearing mechanisms for preloading the latter, each of which includes two preload arrangements, a first or inner arrangement and a second or outer arrangement. The inner arrangement is provided for applying and adjusting a preload force against its associated bearing mechanism before the housing is assembled and its chamber is filled with oil and sealed and the outer arrangement is provided for further adjusting the applied preload force from outside the housing after the latter is assembled and its inner chambers filled with oil and sealed.

9 Claims, 4 Drawing Figures

U.S. Patent  Feb. 10, 1981  Sheet 1 of 2  4,249,420
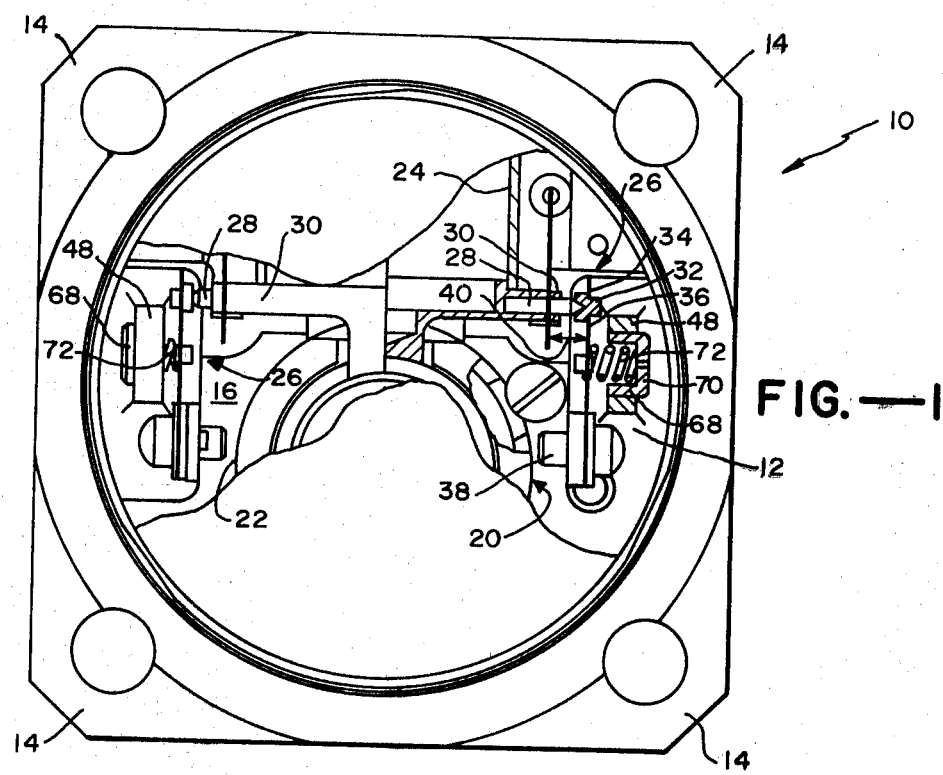
FIG.—1
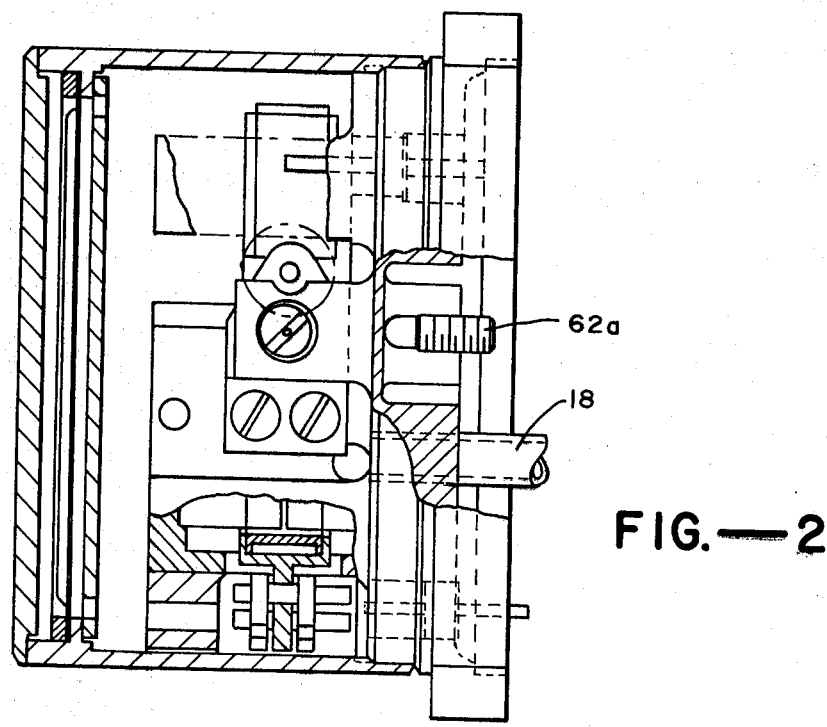
FIG.—2

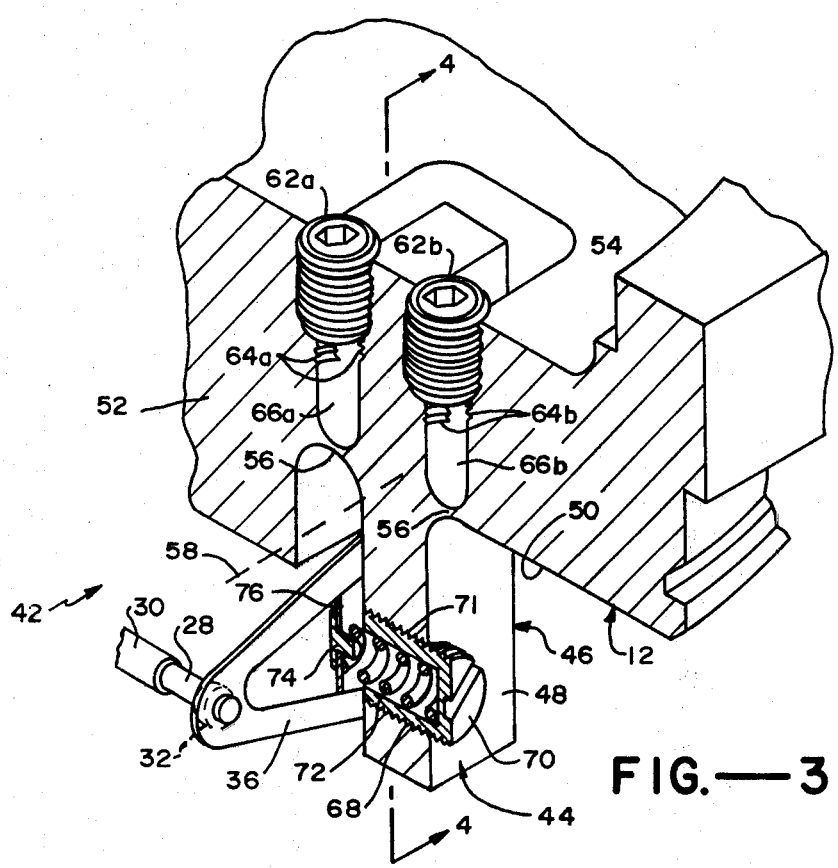
FIG.—3
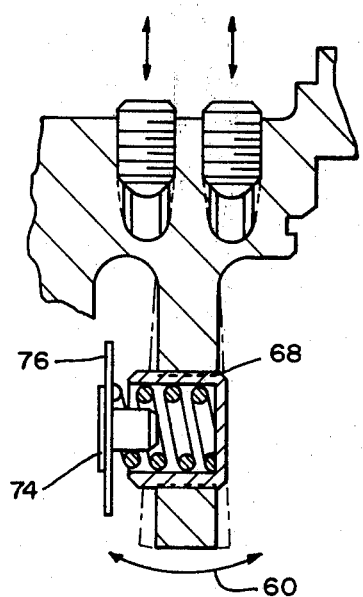
FIG.—4

BEARING PRELOAD ASSEMBLY FOR USE IN AN OIL FILLED ACCELEROMETER

The present invention relates generally to techniques for preloading bearing mechanisms and more particularly to the preloading of bearing mechanisms used in pivotally supporting the pendulous member comprising part of an oil filled pendulous type of accelerometer.

The typical accelerometer of the general type with which the present invention is especially suitable includes a housing defining a sealed, oil filled inner chamber, a pendulous member located within the housing chamber and a pair of bearing mechanisms for pivotally supporting the pendulous member. The accelerometer also includes an arrangement of mechanical and electrical components which may be utilized in a conventional way to sense acceleration by sensing the position of the pendulous member with respect to a fixed pickoff point or points and to provide an electrical signal which corresponds to this position.

There are a number of design requirements in an accelerometer of the type described in order to provide an accurate output reading. One such requirement is that the bearing mechanisms used in supporting the pendulous member be preloaded to a predetermined extent, as is well known in the art. What this means is that a force (a preload force) is applied to each bearing mechanism so that its bearing surface is biased against an associated pivot forming part of the pendulous member.

In the past, a preload adjustment screw located within the housing has been used to accomplish this. One major drawback in this preloading technique is that a further adjustment is usually required or at least should be made after the accelerometer housing has been assembled and its chamber filled with oil and sealed. However, by the time the housing is assembled and sealed, the adjustment screw becomes inaccessible. One way to overcome this problem of inaccessibility is to extend the preload adjustment screw through the housing so that its inner end cooperates with an associated bearing mechanism while its outer end is accessible from outside the accelerometer housing. In this way, the bearings may be preloaded after the housing is assembled and its inner chamber is filled with oil and sealed. A specific mechanical arrangement wbhich could be used in this way is illustrated in U.S. Pat. No. 3,603,159, although the overall accelerometer shown there is not of the type including a sealed, oil filled housing.

While the preload arrangement just discussed, that is, one utilizing an adjustment screw extending through the accelerometer housing, may be suitable for use with accelerometers which do not include sealed, oil filled housings, it leaves room for improvement with respect to accelerometers which do use sealed, oil filled housings. More specifically, in the case of oil filled accelerometers, the necessary passageways through the housing which are required for accommodating the preload adjustment screws also serve as potential leakage paths for the oil within, resulting in potential leakage problems.

As will be seen hereinafter, the present invention provides a preload assembly especially suitable for use in sealed, oil filled accelerometers, and yet one which is adjustable from outside the accelerometer after the latter is assembled, filled with oil and sealed so as to eliminate the problem of inaccessibility discussed above. Moreover, the preload assembly disclosed herein, in its peferred embodiment, does not require ay type of passageway through the accelerometer housing, thereby eliminating a potential source of leakage.

In view of the foregoing, one object of the present invention is to provide an uncomplicated and yet reliable technique for preloading bearing mechanisms, especially bearing mechanisms associated with oil filled accelerometers of the general type described above.

A more specific object of the present invention is to provide a preloading technique having external adjustment capabilities so that when this technique is used with an oil filled accelerometer, the bearing mechanisms within the latter can be adjusted after the accelerometer is assembled, filled with oil and sealed.

Still another specific object of the present invention is to provide a preloading technique having both internal and external preloading capabilities for more accurately preloading devices such as a pendulous type of oil filled accelerometer.

Yet another specific object of the present invention is to provide a preloading technique of the last-mentioned type (one having at least external preloading capabilities) which is especially suitable for use in oil filled accelerometers but which does not require potential leakage passageways through the accelerometer housing (or other such housing).

As stated above, the preload technique disclosed herein is one which is especially suitable for use with an accelerometer of the general type described above, that is, one which includes a sealed, oil filled housing, a pendulous member located with the housing and a pair of bearing mechanisms for pivotally supporting the pendulous member. Therefore, this preload technique will be described herein with respect to such a device. However, it is to be understood that this technique is equally applicable for preloading bearing mechanisms associated with other devices especially devices containing bearing mechanisms within sealed or otherwise closed housings.

As will be discussed in more detail hereinafter, the preloading technique disclosed herein is one which has internal and external adjustment capabilities, in accordance with one aspect of the present invention. In order to provide both of these capabilities, this technique utilizes first means located entirely within the accelerometer housing (or other such housing) and is movable therein for applying and adjusting a preload force against an associated bearing mechanism, whereby to preload the latter to a predetermined extent before the housing is assembled, filled with oil and sealed. This technique also utilizes second means provided for further adjusting the already applied preload force outside the housing after the latter is assembled, filled with oil, and sealed. In this way, most of the preloading of the bearing mechanisms can take place prior to assembly of the accelerometer and after assembly thereof the preloading can be "fine tuned," thereby eliminating the inaccessibility problem discussed previously.

In accordance with a second aspect of the present invention, the second means just referred to includes means integrally formed with one section of the accelerometer housing (within the latter) and supporting the first means (also just referred to) for movement in a way which provides external preloading capabilities without using a passageway through the latter. This, of course, eliminates a potential source of leakage from within the accelerometer, as discussed above.

The preload technique thus far described is incorporated in an overall preload assembly which will be described in more detail hereinafter with respect to the drawings wherein:

FIG. 1 is a partially broken away front elevational view of a sealed, oil filled accelerometer, including preload assemblies designed in accordance with the present invention;

FIG. 2 is a partially broken away side elevational view of the accelerometer illustrated in FIG. 1;

FIG. 3 is a perspective view of a section of the accelerometer of FIGS. 1 and 2, specifically illustrating a preloading assembly designed in accordance with the present invention; and FIG. 4 is a side elevational view of the section illustrated in FIG. 3, taken generally along line 4—4 in FIG. 3.

Turning now to the drawings, wherein like components are designated by like referenced numerals throughout the various figures an oil filled, pendulous type of accelerometer 10 is illustrated generally in FIGS. 1 and 2. As shown there, the accelerometer includes an overall housing 12 which is constructed of any suitable material (e.g. steel) and which includes suitable flange mounts indicated generally at 14. The housing itself is constructed of at least two integrally formed sections which may be readily assembled to provide a sealed, inner chamber 16 to be filled with oil. In this regard one or more fill tubes 18 or other suitable means are used to fill chamber 16 and thereafter closed off and sealed as by crimping or the like.

Accelerometer 10 also includes a pendulous member 20 carrying a torque coil 22 at one end and a float 24 at its other end. The pendulous member also includes two pivots 28 which are connected with and extend out from opposite sides of float 24 by a suitable pivot containing means 30 forming part of the float. This pendulous member is located entirely within chamber 16 and is supported therein for pivotal movement about pivots 28 by means of two bearing mechanisms which are generally indicated at 26 and which will be described below.

As best seen in FIG. 1, each of the bearing mechanisms 26 includes a bearing member 32 defining a bearing surface 34 adapted to accommodate the free end of an associated pivot 28 for rotational movement. In the embodiment illustrated, each of these bearing members is supported at an unconnected end of a leaf spring 36 which is fixed at its other end relative to housing 12 by suitable means generally indicated at 38. In this way, the unconnected end of the leaf spring its free to flex back and forth in the direction of two way arrow 40 for moving bearing member 32 in a general axial direction relative to its pivot 28 which is necessary in order to preload the bearing member with respect to the pivot.

The various components of accelerometer 10 thus far described are conventional and may be readily provided by those with ordinary skill in the art. The accelerometer also includes other conventional components some of which are illustrated in FIGS. 1 and 2 and others which are not illustrated there. These other components cooperate with the ones thus far described to monitor acceleration in a conventional way, that is, by monitoring the position of pendulous member 20 relative to one or more pick-off points in chamber 16 and providing corresponding electrical signal.

Having described the various conventional components of accelerometer 10, attention is now directed to an assembly 42 associated with each bearing mechanism 26 for preloading the latter in accordance with the present invention. One of these preload assemblies is best described with respect to FIGS. 3 and 4 in conjunction with FIGS. 1 and 2. As will be discussed in more detail below, this assembly includes a first arrangement 44 located entirely within housing chamber 16 and moveable therein for applying and adjusting a preload force against an associated one of the bearing mechanisms 26, whereby to preload the latter to a predetermined extent before housing 12 is assembled, filled with oil and sealed. As will also be seen, this assembly includes a second arrangement 46 for adusting or "fine tuning" the applied force and therefore the preload of the bearing mechanism from outside the housing after the latter is assembled, filled with oil and sealed.

For purposes of clarity, attention is first directed to the second-mentioned preload arrangement, that is, arrangement 46. As shown in FIGS. 3 and 4, this arrangement includes an elongated member 48 which extends into housing chamber 16 from a inner surface 50 comprising part of one integrally formed section 52 of housing 12. As seen best in FIGS. 3 and 4, elongated member 48 is integrally formed at its top end with housing Section 52 (as viewed in these figures) and is free to move at its bottom end. Arrangement 46 includes a second elongated member 54 which extends out from the outer surface of the housing section 52 in direct alignment with elongated member 48. Like this latter elongated member, member 54 is integrally formed at one end, specifically its lower end, with housing section 52 and is free to move at its upper end. These two elongated members are separated by relatively thin segments of housing section 52 as generally indicated at 56. As a result of these thin segments and the positional relationship of elongated members 48 and 54, these two members are capable of pivoting or flexing as a single member about a fixed axis 58 (FIG. 3) as indicated by two way arrow 60 (FIG. 4). As will be seen hereinafter, the purpose of this particular movement is to provide external preload cpapabilities to overall assembly 42 without requiring a passageway through housing 12.

In order to actually move the elongated members 48 and 54 in the manner described, arrangement 46 includes two external preload adjusting screws 62a and 62b and complimentary threaded sections 64a and 64b. These threaded sections are provided by housing section 52 and elongated member 54 in the spaces 66a and 66b, respectively, on opposite sides of member 54. The threaded section along each of the openings 66a and 66b tapers inwardly from its top end where it is substantially equal in diameter to that of an associated adjustment screw 62 to its bottom end which is a significantly smaller diameter. In this way, when neither of the adjustment screws 62 are provided within openings 66, the two elongated member 48 and 54 remain in an unbiased, centrally located position, e.g., the vertical position as shown in FIG. 4. However, if one of the adjustment screws, for example the adjustment screw 62a, is moved down and wedged into its associated opening 66a, this causes the two elongated members to flex or pivot in a clockwise direction about axis 58. On the other hand, if the adjustment screw 62b is initially threaded into opening 66b, the two elongated members ae caused to flex or pivot about axis 58 in a counter-clockwise direction. In either case, once the first to these two screws are positioned a desired distance into its associated opening for flexing the two members a given amount, the two members can be locked in this position by inserting the other screw tighly into its associated opening. As will be seen thereafter, this overall adjustment to the position of the two members is responsible for the external preloading capapbilities of overall assembly 42.

Having described arrangement 46, attention is now directed to arrangement 44 which, as stated previously, is responsible for providing the internal preload capabilities of overall assembly 42. As seen in FIGS. 3 and 4, this latter arrangement includes a hollow, externally threaded adjustment screw 68 having a closed, slotted end 70 and an open, opposite end. This adjustment screw is mounted for threaded movement within a cooperating threaded hole 71 extending through member 48 in the pivotal direction of the latter. A preload spring 72 is located within the hollow screw 68 such that one end rests against closed end 70 while its other end extends out from the open end of the screw. The outwardly extending end of spring 72 is positioned around an outwardly projecting dimple 74 comprising part of a leaf spring connecting bar 76. As seen best in FIGS. 1 and 3, connecting bar 76 extends across and is connected with an associated leaf spring 36 at an intermediate point between the fixed and free ends of the latter.

From the foregoing description of arrangmement 44, it should be apparent that movement of threaded screw 68 into cooperating passageway 71, towards the leaf spring causes spring 72 to apply increased force against connecting bar 76 and therefore leaf spring 36 which, in turn, increases the force exerted by bearing member 32 against its associated pivot 28 for increasing the preload of the latter. By the same token, when adjustment screw 70 is moved outward within passageway 71, that is, away from the leaf spring, the force applied against connecting bar 76 is reduced for reducing the preload at bearing member 32.

Having described arrangement 44, attention is now directed to the way in which overall assembly 42 may be used to preload an associated bearing mechanism 26. As an initial step in this procedure, the varius internal components of the accelerometer are assembled which, with respect to pendulous member 20 and bearing mechanisms 26, leads to the positional relationship shown in FIGS. 3 and 4. Thereafter, while the bearing mechanisms are still accessible, that is, before housing 12 is assembled and the chamber 16 sealed, each bearing mechanism is initially preloaded to a desired extent by moving adjustment screw 68 in the manner described previously. This provides the initial or "gross" preload adjustment to each bearing mechanism. Thereafter, housing 12 is closed and its chamber is filled with oil and sealed. After this has been done, the two elongated members 48 and 54 comprising part of overall arrangement 46 are flexed, either clockwise or counter-clockwise, as described previously, for moving the entire adjustment screw 70 either towards or away from leaf spring 36 so as to further adjust or fine tune the force applied to the latter by spring 72. The exact amount of preloading on each bearing mechanism depends upon a particular standard which will determine the amount and direction of movement of both adjustment screw 70 and the elongated members 48 and 54.

From the foregoing, it should be apparent that the overall preload assembly just described in especially suitable for use in oil filled accelerometers, however, it is to be emphasized again that this assembly may also be compatible with other devices utilizing bearing mechanisms which require preloading. In addition, while the overall preload assembly in its preferred embodiment utilizes arrangements 44 and 46 as described above, these arrangements could be modified and yet serve the same end. For example, a force could be applied directly against an associated bearing member rather than using a leaf spring and the adjustment screw 70 could itself be connected with the leaf spring rather than using an intermediate preload spring 72. By the same token, the two elongated members 48 and 54 could possibly be flexed or pivoted in a different way.

It is claimed:

1. In an accelerometer including a sealed, oil filled housing, a pendulous member located within said housing, and a pair of bearing means for pivotally supporting said pendulous member, an assembly for preloading at least one of said bearing means comprising first means located entirely within said housing and movable therein for applying and adjusting a preload force against said one bearing means, whereby to preload the latter to a predetermined extent before said housing is assembled, filled with oil and sealed and second means for further adjusting said applied force and therefore the preloading of said one bearing means from outside said housing after the latter has been assembled, filled with oil and sealed, said second means including inner means located within said housing and movable in a predetermined way for further adjusting said applied force and said preload and outer means located outside said housing for moving said inner means in said predetermined way, said housing including an integrally formed section and said movable inner means being an inside member integrally formed with said housing section and located inside said housing when the latter is assembled.

2. An assembly according to claim 1 wherein said outer means includes an outside member integrally formed with said housing section and located outside said housing when the latter is assembled, said inside and outside members being formed to flex as a single member about a predetermined axis, and wherein said outer means also includes a pair of threaded openings in the outer surface of said housing section on opposite sides of said outside member and a pair of adjustment screws adapted for engagement within said openings to flex said single member, whereby to move said inside member in said predetermined way.

3. In an accelerometer including a sealed, oil filled housing defining an internal chamber, a pendulous member located within said housing chamber, and a pair of bearing means also located within aid chamber for pivotally supporting said pendulous member, an assembly for preloading at least one of said bearing means comprising first means located entirely within said housing chamber and movable therein between different adjustable positions for applying an adjustable force aganst said one bearing means whereby to preload the latter to a predetermined extent before said housing is assembled, filled with oil and sealed, second means located within said housing chamber and supporting said first means for movement between said adjustable positions, said second means being integrally formed to the inner surface of one section of said housing, and third means located outside said housing for moving second means between different adjustable positions whereby to further move said first means and thereby further adjust said applied force and therefore the preloading of said one bearing means from outside said housing after the latter is assembled, filled with oil and sealed.

4. An assembly according to claim 3 wherein said third means includes means located outside said housing and integrally formed with the outer surface of said housing section, wherein said outside means and said second means are formed to flex as a single member about a pedetermined axis whereby to provide said adjustable movement of said second means and wherein said third means also includes means located outside said housing for flexing said single member.

5. In a device including a housing defining an internal chamber and a pair of bearing means located within said chamber for supporting a member for movement therein, an assembly for preloading at least one of said bearing means comprising inner means located entirely within said housing chamber and being movable therein between different adjustable positions for applying an adjustable force against said one bearing means whereby to preload the latter to a predetermined extent, said inner means including an inner member integrally formed to the inner surface of one section of said housing, and outer means located outside said housing for moving said inner member between different adjustable positions whereby to move said inner means and thereby provide said applied force and therefore the preloading of said one bearing means from outside said housing after the latter is assembled.

6. In an accelerometer including a sealed, oil filled housing defining an inner chamber, a pendulous member located within said housing chamber, and a pair of bearing means also located within said chamber for pivotally supporting said pendulous member, an arrangement associated with each of said bearing means for preloading the latter, each of said arrangements comprising a first elongated member located entirely within said housing chamber and integrally formed with the inner surface of one section of said housing, inner means located entirely within said housing and being supported by said first elongated member for movement between different adjustable positions for applying an adjustable force against said associated bearing means, whereby to preload the latter to a pedetermined extent before said housing is assembled, filled with oil and sealed, said inner means including an adjustable screw thread mounted for movement through and relative to said elongated member and means interconnecting said screw with said associated bearing means for applying said adjustable force depending upon the position of said screw relative to said elongated member and outer means located outside said housing for moving said elongated member between different adjustable positions for moving said screw whereby to adjust said applied force and the preloading of said associated bearing means from outside said housing after the latter is assembled, filled with oil and sealed, said outer means including a second elongated member located outside said housing and integrally formed with the outer surface of said housing section, said first and second elongated members being formed to flex as a single member whereby to move the inner elongated member between said different adjustable positions.

7. In an accelerometer including a sealed, oil filled housing defining an internal chamber, a pendulous member located within said housing chamber, and a pair of bearing means also located within said chamber for pivotally supporting said pendulous member, an assembly for preloading at least one of said bearing means comprising first means located entirely within said housing chamber for applying an adjustable force against said one bearing means, said force depending on how said first means is adjustably moved between different adjustable positions, second means located within said housing chamber and supporting said first means for movement between said adjustable positions, said second means located within said housing chamber and supporting said first means for movement between said adjustable positions, said second means being integrally formed to the inner surface of one section of said housing and movable in a predetermined way for moving said first means between said adjustable positions, and third means located outside said housing for moving second means in said predetermined way whereby to move said first means and thereby adjust said applied force and therefore the preloading of said one bearing means from outside said housing after the latter is assembled, filled with oil and sealed.

8. In an accelerometer including a sealed, oil filled housing defining an internal chamber, a pendulous member located within said housing chamber, and a pair of bearing means also located within said chamber for pivotally supporting said pendulous member, an assembly for preloading at least one of said bearing means comprising first means located entirely within said housing chamber and movable therein between different adjustable positions for applying an adjustable force against said one bearing means whereby to preload the latter to a predetermined extent before said housing is assembled, filled with oil and sealed, second means located within said housing chamber and supporting said first means for movement between said adjustable positions, third means located outside said housing for moving said second means between different adjustable positions whereby to further move said first means and thereby further adjust said applied force and therefore the preloading of said one bearing means from outside said housing after the latter is assembled, filled with oil and sealed, and means consisting only of metals for connecting said second and third means to said housing so as not to result in a passage through said housing at any point of connection between the housing and the second and third means.

9. In a device including a housing defining an internal chamber and a pair of bearing means located within said chamber for supporting a member for movement therein, an assembly for preloading at least one of said bearing means comprising inner means located entirely within said housing chamber and being movable therein between different adjustable positions for applying an adjustable force against said one bearing means whereby to preload the latter to a predetermined extent, said inner means including an inner elongated member connected to the inner surface of one section of said housing for lateral movement relative thereto, and outer means located outside said housing and including an outer elongated member connected to the outer surface of said housing for lateral movement relative thereto whereby to move said inner member laterally between different adjustable positions so as to move said inner means and thereby provide said applied force and therefore the preloading of said one bearing means from outside said housing after the latter is assembled.

* * * * *